April 21, 1936. A. OBERHOFFKEN 2,037,735
ELECTRIC MOTOR AND BRAKE THEREFOR
Filed Aug. 20, 1934 2 Sheets-Sheet 1
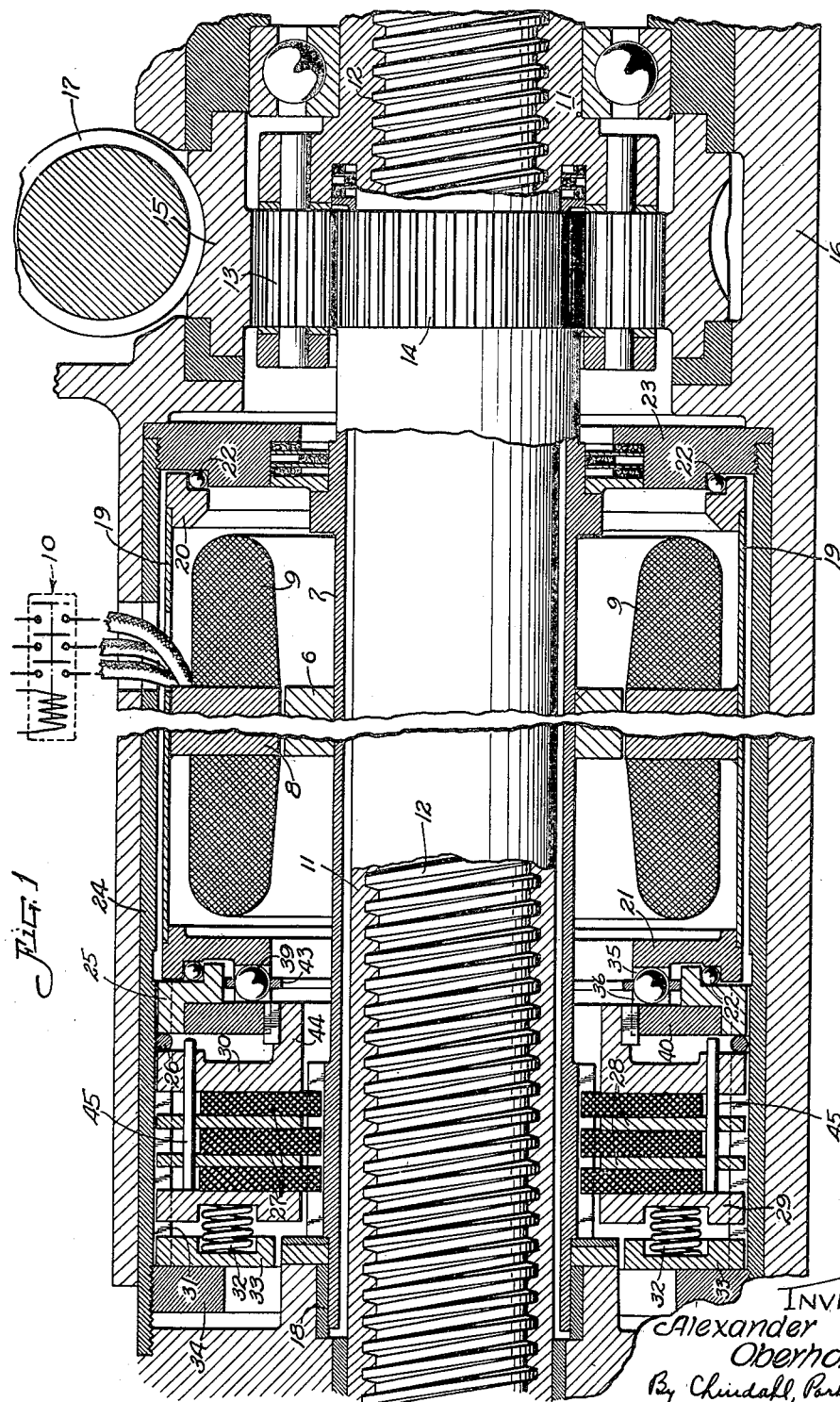
INVENTOR
Alexander
Oberhoffken
By Chindahl, Parker & Carlson
ATTORNEYS April 21, 1936.                A. OBERHOFFKEN                2,037,735
                    ELECTRIC MOTOR AND BRAKE THEREFOR
                Filed Aug. 20, 1934          2 Sheets-Sheet 2
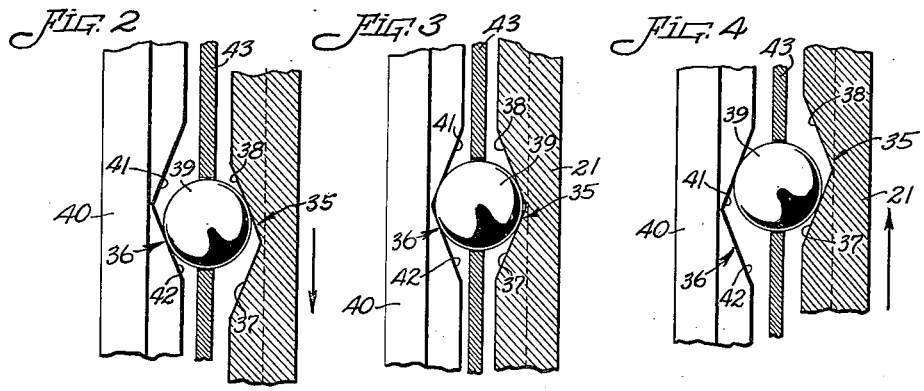
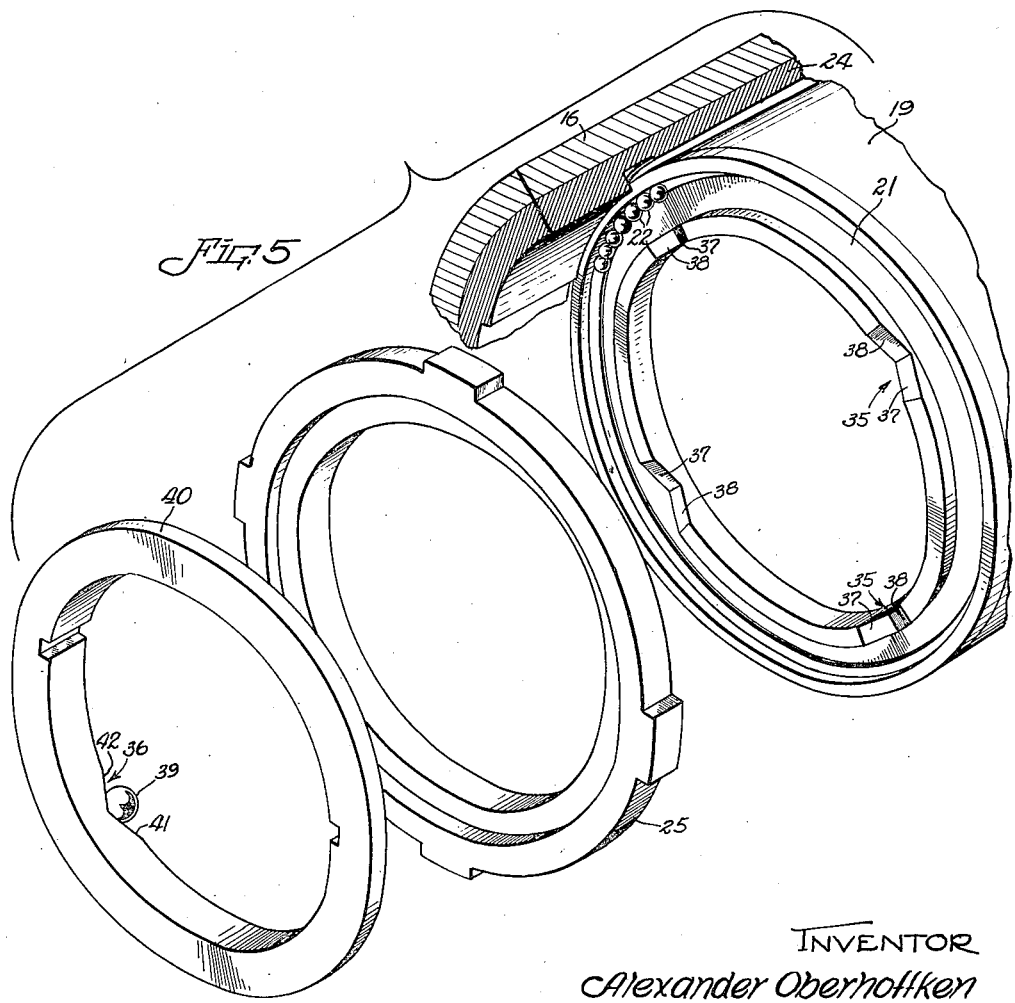
INVENTOR
Alexander Oberhoffken
By Chindahl, Parker + Carlson
ATTORNEYS Patented Apr. 21, 1936

2,037,735

UNITED STATES PATENT OFFICE 2,037,735

ELECTRIC MOTOR AND BRAKE THEREFOR

Alexander Oberhoffken, Rockford, Ill., assignor to The Ingersoll Milling Machine Company, Rockford, Ill., a corporation of Illinois Application August 20, 1934, Serial No. 740,579

12 Claims. (Cl. 188—171)

This invention relates to brakes for electric motors and more particularly to a brake which is released automatically as an incident to energization of the motor and applied when the motor is excited.

Electric motors are frequently equipped with normally applied friction brakes arranged to be released by separate solenoids which are energized automatically when energizing current is applied to the motor. Such brakes are not only bulky in character and costly in construction, but the degree of braking action which can be produced reliably and without frequent adjustment is limited.

The primary object of the present invention is to overcome the above objections by providing a motor brake arranged to be actuated by a force derived from the reaction which is exerted on the stator of the motor when the latter is energized.

More particularly, the invention aims to provide a normally applied motor brake which is released automatically by an angular movement of the motor stator occurring when the motor is energized.

Another object is to provide an automatic brake of this character which is applicable to reversible motors.

The invention also resides in the novel character of the brake-actuating means and the manner of maintaining the brake normally applied.

Other objects and advantages of the invention will become apparent from the following detailed description taken in connection with the accompanying drawings, in which Figure 1 is a fragmentary cross-sectional view of an electric motor and brake embodying the features of the present invention.

Figs. 2, 3, and 4 are views showing different positions of parts of the brake-actuating mechanism.

Fig. 5 is a fragmentary perspective view showing the motor and the parts of the brake-actuating mechanism in separated relation.

Although the invention is applicable to any type of rotary electric motor, it is shown in the drawings for the purpose of illustration as being embodied in a reversible motor of the three phase induction type comprising a squirrel cage rotor 6 fast upon a shaft in the form of a sleeve 7 and enclosed by a stator or field member 8 magnetized by the excitation of windings 9. By selective operation of a reversing switch 10, the relation of the currents in the windings may be varied to induce rotation of the motor in one direction or the other as desired.

To illustrate one character of load to which the motor may be subjected, the motor shown is arranged to drive an elongated nut 11 threaded onto a screw 12 by which motion may be imparted to a part to be actuated. The drive connection to the nut is through a planetary gearing having planet gears 13 rotatably supported on the nut and meshing with a sun gear 14 fast on the rotor shaft 7 and also with a ring gear 15 journaled in a suitable frame structure 16 and driven or held against rotation by a worm 17 with which the ring gear meshes. The rotor shaft is thus supported at one end, the opposite end being journaled in a bearing 18 on the frame 16.

For deriving a brake-actuating force from the reaction which is exerted on the field member of the motor when the windings 9 are energized, the field member is mounted for a limited degree of angular motion about the rotor axis. To provide such a mounting, the outer shell 19 of the field member 8 is equipped at opposite ends with rings 20 and 21 which define the outer raceways for anti-friction elements 22 running in complemental raceways, one formed on a ring 23 threading into one end of the motor housing 24 which is received in a cylindrical recess in the frame structure 16. The other inner raceway is on a ring 25 splined into the opposite end of the housing 24 and held in position by a suitable snap ring 26 seated in an annular groove in the housing.

The friction brake shown herein is of the axially engaging type comprising a series of rotatable friction elements in the form of disks 27 of suitable friction material alternating with non-rotatable disks 28, 29 and 30. The disks 27 rotate with the rotor 6 and for this purpose are splined on the projecting end of the shaft 7, being thereby adapted to float axially. The non-rotatable disks are received in internal spline grooves 31 in the motor housing, the terminal disk 30 being disposed adjacent the snap ring 26 which serves as an abutment for locating the disk axially.

To normally maintain the brake applied and thereby hold the rotor against turning when the motor is deenergized, the disk 29 is constantly urged toward the disk 30 by a plurality of compression springs 32 disposed between and seated in the disk 29 and a plate 33 lying against a plug 34 which threads into the end of the housing 24 to permit wear at the friction faces to be taken up and the spring action adjusted to vary the degree of braking action as desired. The rotatable and non-rotatable friction surfaces are thus constantly pressed into gripping engagement when the springs are permitted to act.

The field member 8 is maintained in a predetermined position when the motor is deenergized and means is provided for utilizing the angular movement of the member in either direction away from this position to release the brake. In the present embodiment, this means takes the form of cams 35 and 36 which cooperate to establish the normal brake-actuated position of the field member and operate, when the motor is energized, to augment the actuating force thus derived and apply the same in a direction to shift the disk 29 axially and compress the springs 32 thereby relieving the pressure on the braking elements. The cams 35 are annularly spaced around the ring 21 and each comprises two converging surfaces 37 and 38 which form a notch in which a ball 39 is seated. The cams 36, which are carried by a follower plate 40, comprise converging surfaces 41 and 42 shaped and spaced similar to the cams 35 and facing oppositely therefrom so as to receive the balls 39 which are held in place by a ring 43 having annularly spaced holes in which the balls are received loosely. The follower plate 40 is supported by a cylindrical flange 44 on the disk 30 being keyed thereto so as to be held against rotation but free to slide axially. The axial movement of the plate 40 is transmitted to the disk 33 through the medium of pins 45 supported by the disks 28 and 30.

In view of the relatively steep angles of the cam surfaces and the high efficiency of the motion-transmitting connection resulting from the use of the anti-friction follower elements, the springs 32 become active, when the motor is deenergized, to move the field member back to its normal rest position which is determined by the opposed cam notches which are in register or substantially so as shown in Figs. 1 and 3 when the field member is in normal brake-applying position. In this position of the field member, the springs 32 press the braking elements into gripping engagement, the rotor being thereby held against turning.

Assume now that current is applied to the motor windings 9 to induce rotation of the rotor in a counter-clockwise direction as viewed in Fig. 5. Since the rotor and stator are thus magnetically coupled together, the resistance which the load offers to turning of the rotor will cause a reactive force on the stator tending to turn the latter in a direction reverse to the motion of the rotor. Thus, the cams 35 will be carried along with the field member 8, the balls 39 rolling along the surfaces 38 and 42 as illustrated in Fig. 2 resulting in axial movement of the disk 29 in a direction to compress the springs 32 and thereby release the brake. This movement of the disk is limited by the springs so that the angular movement of the field member is arrested before the balls pass out of engagement with the cam surfaces, the brake being held released in the continued operation of the motor. When the motor is deenergized, the field member is released for rotation back to brake-applying position which is effected by the springs 32 acting through the medium of the cams in the manner above described.

The brake is applied in a similar way, when the motor is energized to cause rotation of the rotor in the opposite or clockwise direction. In this case, the field member moves in the direction indicated in Fig. 4, and the balls roll along the cam surfaces 37 and 41 to produce the brake-releasing movement of the disk 29. The parts are restored to brake-applying position when the motor is again deenergized.

From the foregoing, it will be apparent that the brake is released automatically as an incident to the energization of the motor to turn the rotor in either direction and is applied as an incident to deenergization of the motor. The structure is simple and compact, and the brake as a whole is more effective than the solenoid operated brakes ordinarily used. This is for the reason that a more powerful force is available to release the brake; consequently, greater spring pressure may be employed for applying the brake.

I claim as my invention:

1. The combination with an electric motor having its field member mounted for a limited degree of angular movement by the reactive force exerted thereon when the motor is energized, a friction element connected with an rotatable in unison with the rotor of said motor, a non-rotatable friction element normally maintained in gripping engagement with said rotatable element when said motor is deenergized whereby a braking action is exerted on said rotor, and means actuated by the angular movement of said member when the motor is excited and operating to release the pressure on said elements and thereby permit free rotation of said rotor.

2. The combination of an electric motor having a field member mounted for floating angular motion about the rotor to permit of a limited degree of such motion by the reactive force exerted on the member when the motor is excited, means normally acting to exert a braking action resisting rotation of the motor rotor, and means actuated in the movement of said member to release said braking action when the motor is energized.

3. The combination of an electric motor having a rotor and a field member mounted for a limited degree of angular motion about said rotor by the reactive force exerted thereon when the motor is excited under load, a friction brake for arresting rotation of the motor rotor, an actuating member movable in opposite directions to apply and release said brake, means operated by angular movement of the field member to move said actuating member in one direction when the field member is energized and spring means tending to move said actuating member in the opposite direction when the motor is deenergized.

4. The combination of an electric motor having a rotor and a field member mounted for angular movement away from a normal rest position automatically by the reaction of the load on the rotor when the motor is energized and means for arresting rotation of the rotor of said motor when the motor is deenergized comprising a friction brake released and applied automatically in the angular movement of said member resulting from energization and deenergization of said motor.

5. The combination of an electric motor having a rotor and a field member movable angularly away from a normal rest position by the reaction of the load on said rotor when the motor is energized, a friction brake for said rotor, means operating to release the brake in the movement of the member away from said rest position, and a single spring means, acting when the motor is deenergized, to apply said brake and also to restore said member to said rest position.

6. The combination of an electric motor having a rotor and a field member movable angularly away from a normal rest position by the reaction of the load on said rotor when the motor is energized, a friction brake for said rotor, means operating to release the brake in the movement of the member in either direction away from said rest position, and a single spring means acting to apply said brake when the motor is deenergized and operating through said last mentioned means to restore said member to normal brake-applied position.

7. The combination of an electric motor having a rotor and a field member movable angularly in either direction from a normal rest position by the reaction of the load on said rotor when the motor is energized, a friction brake for said rotor, means operating to release the brake in the movement of the member in either direction away from said rest position, including a cam and a follower therefor cooperating to establish the rest position of said member, and a single spring means acting to apply said brake when the motor is deenergized and operating through the medium of said cam means to restore said member to and maintain the same in said normal brake-applied position.

8. The combination of an electric motor having a rotor and a field member movable angularly in either direction from a normal rest position by the reaction of the load on said rotor when the motor is energized, a friction brake for said rotor, means operating to release the brake in the movement of the member in either direction away from said rest position, and spring means acting when the motor is deenergized, to apply said brake and also restore said member to said rest position from either actuated position.

9. The combination with a reversible electric motor having a rotor and a field member, the latter being mounted for a limited degree of angular movement in either direction relative to a normal rest position, a friction element rotatable in unison with said rotor, a coacting non-rotatable friction element, spring means normally acting to maintain said elements in gripping engagement when the motor is idle, and means actuated in the movement of said member in either direction away from said rest position and operating to release the gripping pressure on said elements against the action of said spring means.

10. The combination of an electric motor having a rotor and a field member floatingly mounted for limited angular movement in either direction from a normal rest position occupied by the member when the latter is deenergized, a normally applied friction brake for said rotor, and means actuated by the angular movement of said member and operating to release the brake in the movement of the member in either direction away from said rest position.

11. The combination of an electric motor having a rotor and a field member mounted for floating angular motion about the rotor to permit of a limited degree of such motion under the reactive force exerted on the member when the motor is excited, axially engageable friction elements arranged at one end of said rotor, one element being rotatable with said rotor and the other being relatively non-rotatable, spring means normally acting to maintain said elements in gripping engagement, and means actuated by the angular movement of said member and operating to release the axial pressure on said elements when the motor is energized.

12. The combination of an electric motor having a field member mounted for floating angular motion about the rotor to permit of a limited degree of such motion by the reactive force exerted on the member when the motor is excited, rotatable and non-rotatable friction braking elements disposed concentric with the shaft of said motor, the rotatable element being fast on said shaft, spring means normally acting to urge said elements into gripping engagement whereby to apply a braking action to said shaft, and means actuated in the angular movement of said member to separate said elements against the action of said spring means whereby to release said brake and permit free rotation of said shaft.

ALEXANDER OBERHOFFKEN.